US012492082B2

United States Patent
Nakamura et al.

(10) Patent No.: US 12,492,082 B2
(45) Date of Patent: Dec. 9, 2025

(54) PALLET REVERSING APPARATUS FOR CONVEYOR

(71) Applicant: TOYOTA BOSHOKU KABUSHIKI KAISHA, Aichi-ken (JP)

(72) Inventors: Yoshio Nakamura, Seto (JP); Takahiro Ishikawa, Anjo (JP); Koji Inukai, Anjo (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 90 days.

(21) Appl. No.: 18/396,834

(22) Filed: Dec. 27, 2023

(65) Prior Publication Data
US 2024/0217755 A1 Jul. 4, 2024

(30) Foreign Application Priority Data
Dec. 28, 2022 (JP) .................. 2022-211196

(51) Int. Cl.
*B65G 47/252* (2006.01)
*B65G 17/32* (2006.01)
*B65G 25/04* (2006.01)
*B65G 47/28* (2006.01)
*B65G 17/38* (2006.01)

(52) U.S. Cl.
CPC ......... *B65G 47/252* (2013.01); *B65G 17/323* (2013.01); *B65G 25/04* (2013.01); *B65G 47/28* (2013.01); *B65G 17/385* (2013.01); *B65G 2201/022* (2013.01); *B65G 2203/042* (2013.01); *B65G 2812/02811* (2013.01)

(58) Field of Classification Search
None
See application file for complete search history.

(56) References Cited

U.S. PATENT DOCUMENTS

| 4,344,727 | A | * | 8/1982 | Chaloupka | ............. | B65H 31/38 |
| | | | | | | 414/758 |
| 5,056,649 | A | * | 10/1991 | Oshida | ............. | B65G 47/38 |
| | | | | | | 198/706 |
| 5,301,793 | A | * | 4/1994 | Kovacs | ............. | B65G 47/252 |
| | | | | | | 198/415 |

(Continued)

FOREIGN PATENT DOCUMENTS

JP     5-43301     2/1993

*Primary Examiner* — Joseph A Dillon, Jr.
(74) *Attorney, Agent, or Firm* — Greenblum & Bernstein, P.L.C.

(57) ABSTRACT

There is provided a pallet reversing apparatus for a conveyor that conveys a pallet including a die having a front surface and a back surface. The pallet reversing apparatus for the conveyor includes: a rotating unit that rotates the pallet with respect to a conveyance direction via a shaft provided at a center of the pallet; and a hooked portion provided at one end of the shaft. The rotating unit is provided on one side of a rotation shaft of a head or a tail of the conveyor, and rotates in synchronization with the rotation shaft. The rotating unit includes a hook portion configured to rotate with respect the conveyance direction. The rotating unit rotates the hook portion by 180 degrees in a state of hooking the hook portion to the hooked portion, so that the pallet is reversed with respect to the conveyance direction.

8 Claims, 7 Drawing Sheets

(56) References Cited

U.S. PATENT DOCUMENTS

| | | | | |
|---|---|---|---|---|
| 5,398,802 A | * | 3/1995 | Clopton | B65G 17/002 198/465.1 |
| 6,782,991 B2 | * | 8/2004 | Johansson | B65G 47/252 198/377.07 |
| 11,505,418 B2 | * | 11/2022 | Stolzer | B65G 47/252 |
| 2008/0283359 A1 | * | 11/2008 | Wen | B65G 49/067 198/403 |
| 2018/0297784 A1 | * | 10/2018 | Park | B65G 37/00 |
| 2019/0315572 A1 | * | 10/2019 | Kim | B65G 29/00 |

* cited by examiner

PALLET REVERSING APPARATUS FOR CONVEYOR

CROSS-REFERENCE TO RELATED APPLICATIONS

This application is based on and claims priority under 35 USC 119 from Japanese Patent Application No. 2022-211196 filed on Dec. 28, 2022, the contents of which are incorporated herein by reference.

TECHNICAL FIELD

The present invention relates to a pallet reversing apparatus for a conveyor.

BACKGROUND ART

In the related art, in a pallet reversing apparatus provided in the middle of a conveyor that conveys a pallet including a die whose front surface and back surface are different, a clamping mechanism portion that holds both sides of the pallet is provided on both sides of the conveyor.

The pallet reversing apparatus can freely move forward and backward with respect to the pallet, controls the pallet such that the pallet can be freely rotated, and controls the pallet such that the pallet can be freely raised and lowered (for example, see JPH05-43301A).

The pallet reversing apparatus for a conveyor in the related art uses the clamping mechanism portion to clamp both sides of the pallet, raise the pallet from the conveyor, reverse the pallet, then lower the pallet, and place the pallet on the conveyor. Accordingly, the die of the pallet can be replaced from the front surface to the back surface or from the back surface to the front surface.

Therefore, it is possible to significantly reduce the time and effort for replacing the pallet, which needs to be replaced for each product, and to produce two types of products using one type of pallet including the die whose front surface and back surface are different.

However, when the pallet reversing apparatus for a conveyor in the related art reverses the pallet, the conveyance of the conveyor needs to be temporarily stopped.

Therefore, this point is a factor that reduces the production efficiency for the product.

SUMMARY OF INVENTION

The present invention provides a pallet reversing apparatus for a conveyor that does not stop the conveyance by the conveyor when reversing a pallet including a die whose front surface and back surface are different.

According to an illustrative aspect of the present disclosure, a pallet reversing apparatus for a conveyor configured to convey a pallet including a die whose a front surface and a back surface are different includes: a rotating unit configured to rotate the pallet with respect to a conveyance direction via a shaft provided at a center of the pallet; and a hooked portion provided at one end of the shaft. The rotating unit is provided on one side of a rotation shaft of a head or a tail of the conveyor, and rotates in synchronization with the rotation shaft. The rotating unit includes a hook portion configured to rotate with respect to the conveyance direction. The rotating unit rotates the hook portion by 180 degrees in a state of hooking the hook portion to the hooked portion, so that the pallet is reversed with respect to the conveyance direction.

According to another illustrative aspect of the present disclosure, a pallet reversing apparatus for a conveyor configured to convey a pallet including a die whose a front surface and a back surface of the die are different includes: a rotating unit configured to rotate the pallet with respect to a conveyance direction via a shaft provided at a center of the pallet; and a hooked portion provided at one end of the shaft. The rotating unit is provided on one side of a rotation shaft of a head or a tail of the conveyor, and rotates in synchronization with the rotation shaft. The rotating unit includes a hook portion configured to advance and retreat with respect to the hooked portion, and configured to rotate with respect the conveyance direction. The rotating unit rotates the hook portion by 180 degrees in a state of hooking the hook portion to the hooked portion, so that the pallet is reversed with respect to the conveyance direction.

According to the above aspects, the pallet can be reversed in synchronization with the conveyance speed of the conveyor, and the die of the pallet can be replaced from the front surface to the back surface or from the back surface to the front surface.

Therefore, it is possible to significantly reduce the time and effort for replacing the pallet, which needs to be replaced for each product, and to produce two types of products using one type of pallet including the die whose front surface and back surface are different.

Further, when the pallet is reversed, the conveyance speed of the conveyor is not reduced, and the conveyance of the conveyor is not stopped. Therefore, the production efficiency for the product can be increased.

DESCRIPTION OF EMBODIMENTS

A pallet reversing apparatus 10 for a conveyor according to the present invention will be described.

The pallet reversing apparatus 10 is provided at a tail T of a conveyor 11 that sequentially conveys a plurality of pallets P.

Figure 1:
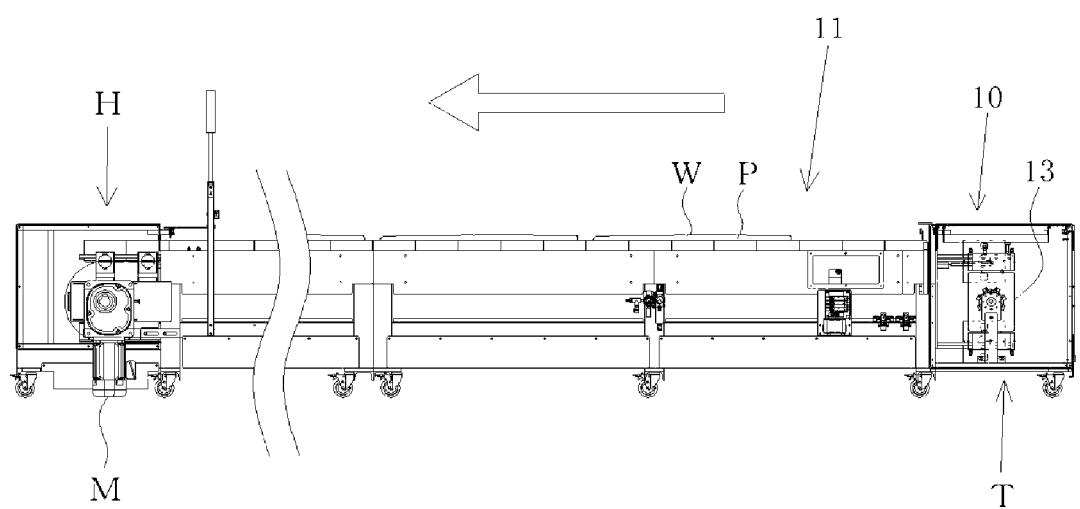
FIG. 1 is an explanatory side view of a pallet reversing apparatus for a conveyor.
Figure 2:
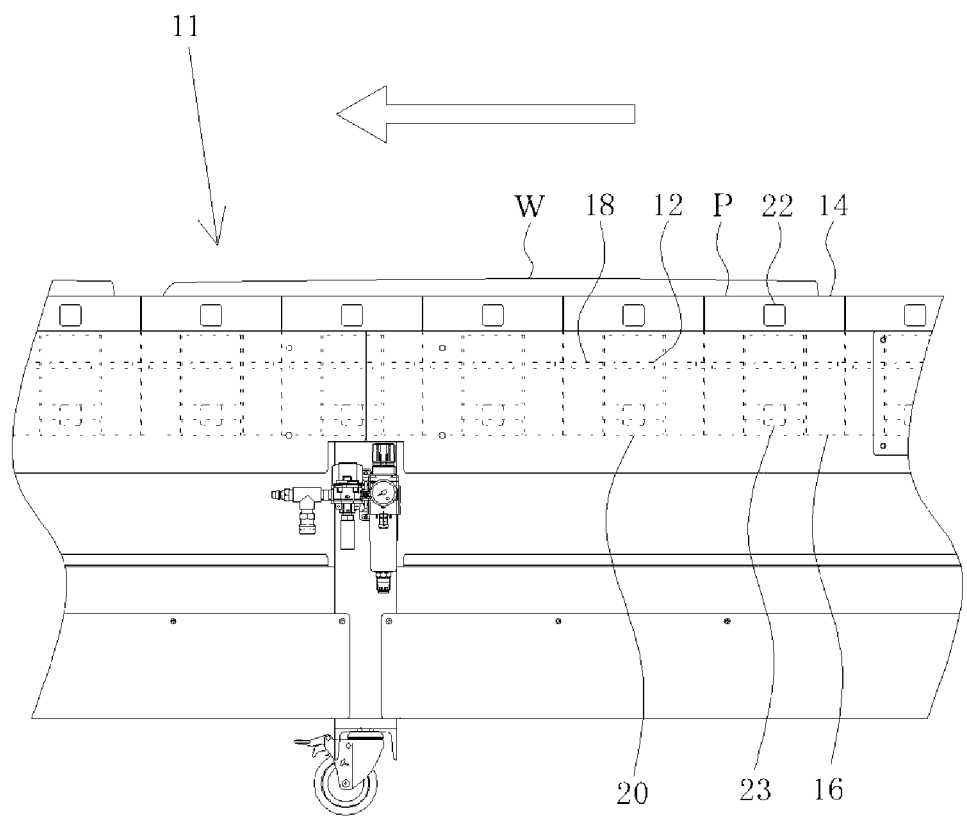
FIG. 2 is a partially enlarged explanatory side view of the conveyor.

The conveyor 11 is a known chain conveyor in which a motor M with a speed reducer is connected to a rotation shaft (not shown) of a head H (see FIGS. 1 and 2). The motor M is a driving unit.

The conveyor 11 is not limited to a chain conveyor.

Figure 3:
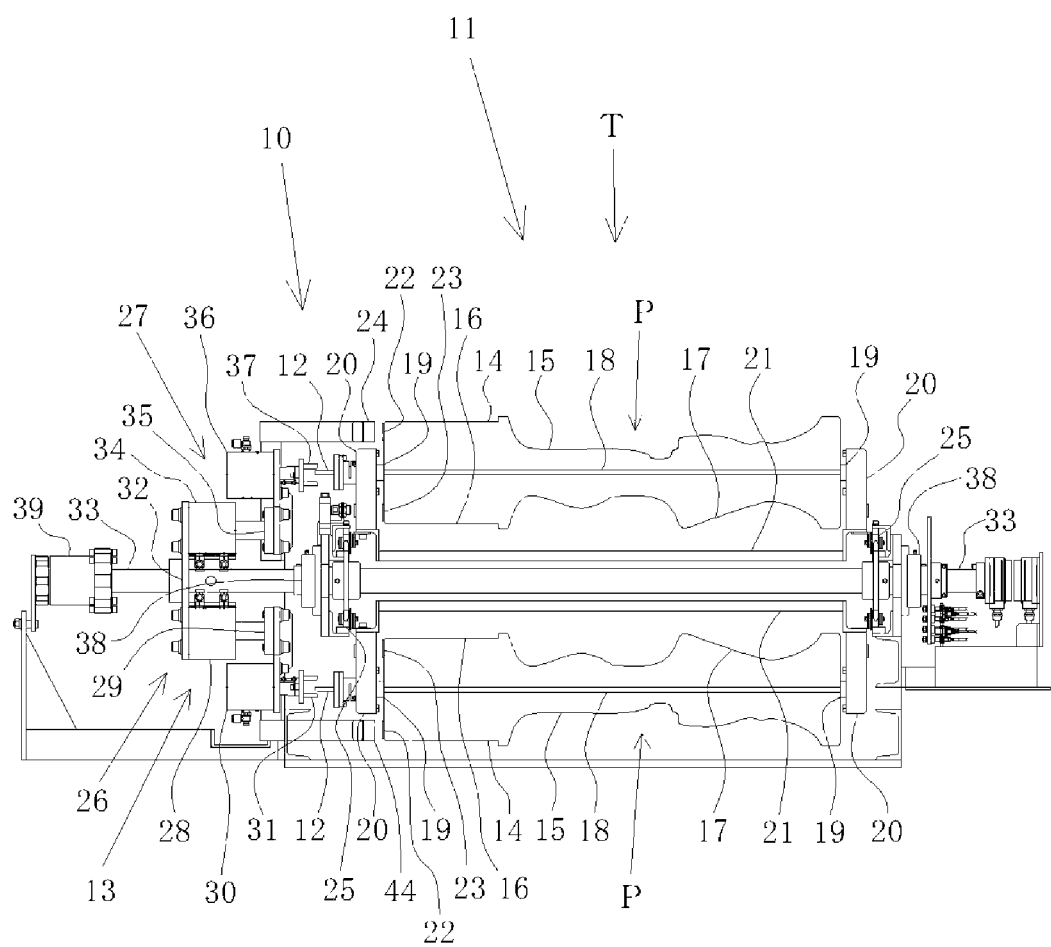
FIG. 3 is an explanatory front view of the pallet reversing apparatus for a conveyor.

The pallet reversing apparatus 10 mainly includes a hooked portion 12 and a rotating unit 13 that are provided on the pallet P (see FIG. 3).

The pallet P is a pallet divided into five dies in order to form a die of one product by combining five pallets P side by side (see FIG. 2).

Figure 4:
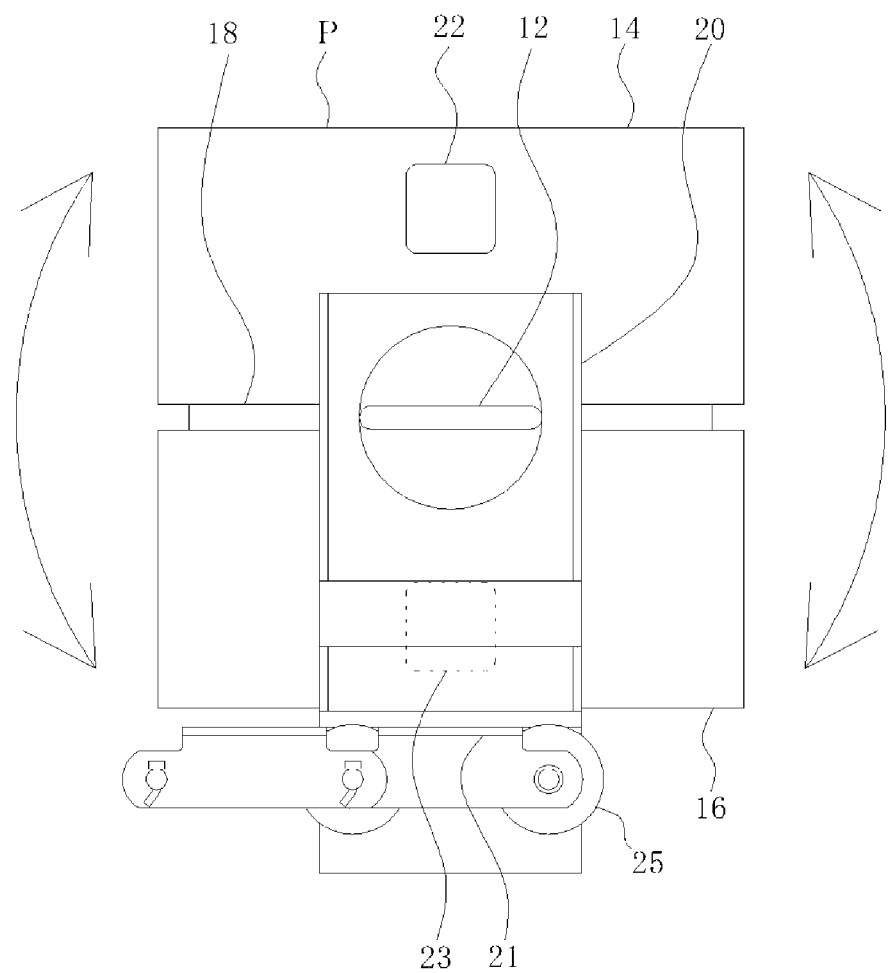
FIG. 4 is an enlarged explanatory side view of a pallet.

Each of the pallets P is a pallet in which a die 15 on a front surface 14 and a die 17 on a back surface 16 are different (see FIGS. 3 and 4).

An operator places a product W on the die formed by combining the five pallets P side by side, which are sequentially conveyed by the conveyor 11, and performs an operation.

The pallet P in the pallet reversing apparatus 10 for a conveyor according to the present invention is not limited to the above-described divided pallet.

The die 15 on the front surface 14 of the pallet P and the die 17 on the back surface 16 of the pallet P are partitioned in an upper-lower direction by a flat plate member 18 horizontally provided at the center.

An identification code 22 for identifying the die 15 on the front surface 14 is attached to a side surface of the die 15.

An identification code 23 for identifying the die 17 on the back surface 16 is attached to a side surface of the die 17.

An upper identification sensor 24 and a lower identification sensor 44 that are provided on one end side of the conveyor 11 read the identification code 22 or 23 and identify the die 15 or 17 of the pallet P.

Both ends at the center of the flat plate member 18 are connected to shafts 19 and 19.

The shafts 19 and 19 are rotatably supported by pallet bearings 20 and 20.

Accordingly, the shafts 19 and 19 are provided at the center of the pallet P, and the pallet P is provided rotatably about the shafts 19 and 19 in a conveyance direction of the conveyor 11.

Lower ends of the pallet bearings 20 and 20 are connected to each other via an attachment 21.

The attachment 21 is connected to chains 25 and 25 of the conveyor 11.

Accordingly, the pallet P is conveyed by the driving of the conveyor 11.

The hooked portion 12 is connected to one end of one shaft 19.

The hooked portion 12 is formed of one plate member that protrudes to the outside of the conveyor 11, and is provided horizontally on the same line as the flat plate member 18.

Accordingly, when the hooked portion 12 is rotated by 180 degrees with respect to the conveyance direction of the conveyor 11, the flat plate member 18 is also rotated by 180 degrees in synchronization, and the pallet P is reversed.

Figure 5:
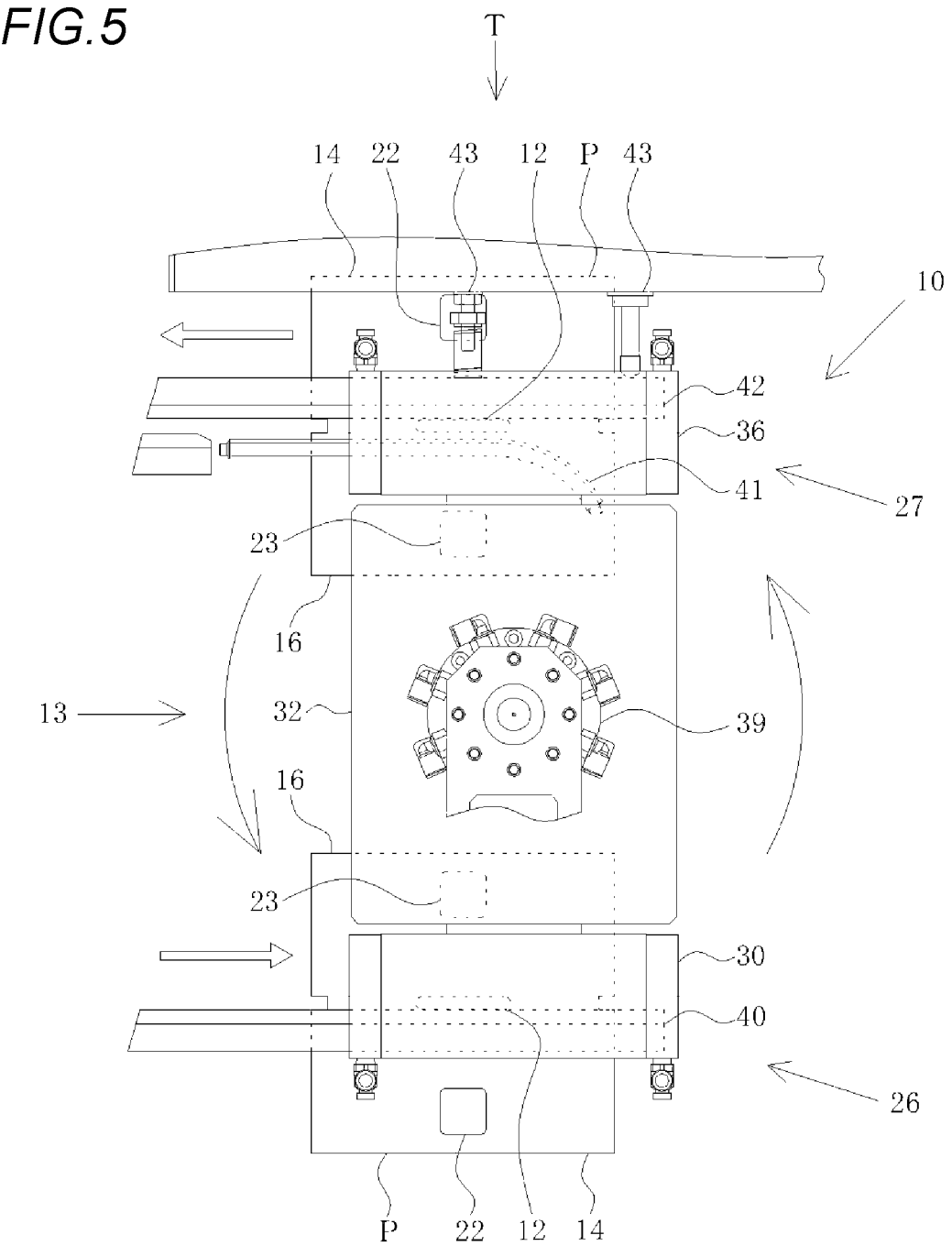
FIG. 5 is a partially enlarged explanatory side view of the pallet reversing apparatus for a conveyor.

After the hooked portion 12 is guided by a lower guide 40 at the tail T of the conveyor 11, the hooked portion 12 is guided by hook portions 31 and 37 of the rotating unit 13 to be described later, and is again guided between upper guides including a bent member 41 and a horizontal member 42 (see FIG. 5).

Therefore, during the conveyance of the pallet P, since the hooked portion 12 is always guided, the hooked portion 12 does not rotate erroneously.

Therefore, at the tail T of the conveyor 11, the pallet P is not reversed erroneously.

Since buffer members 43 and 43 made of a spring material are in contact with an upper surface of the horizontal member 42, the horizontal member 42 itself moves with a margin in the upper-lower direction.

Therefore, the hooked portion 12 to be guided is not hooked and stopped between the upper guides.

Figure 6:
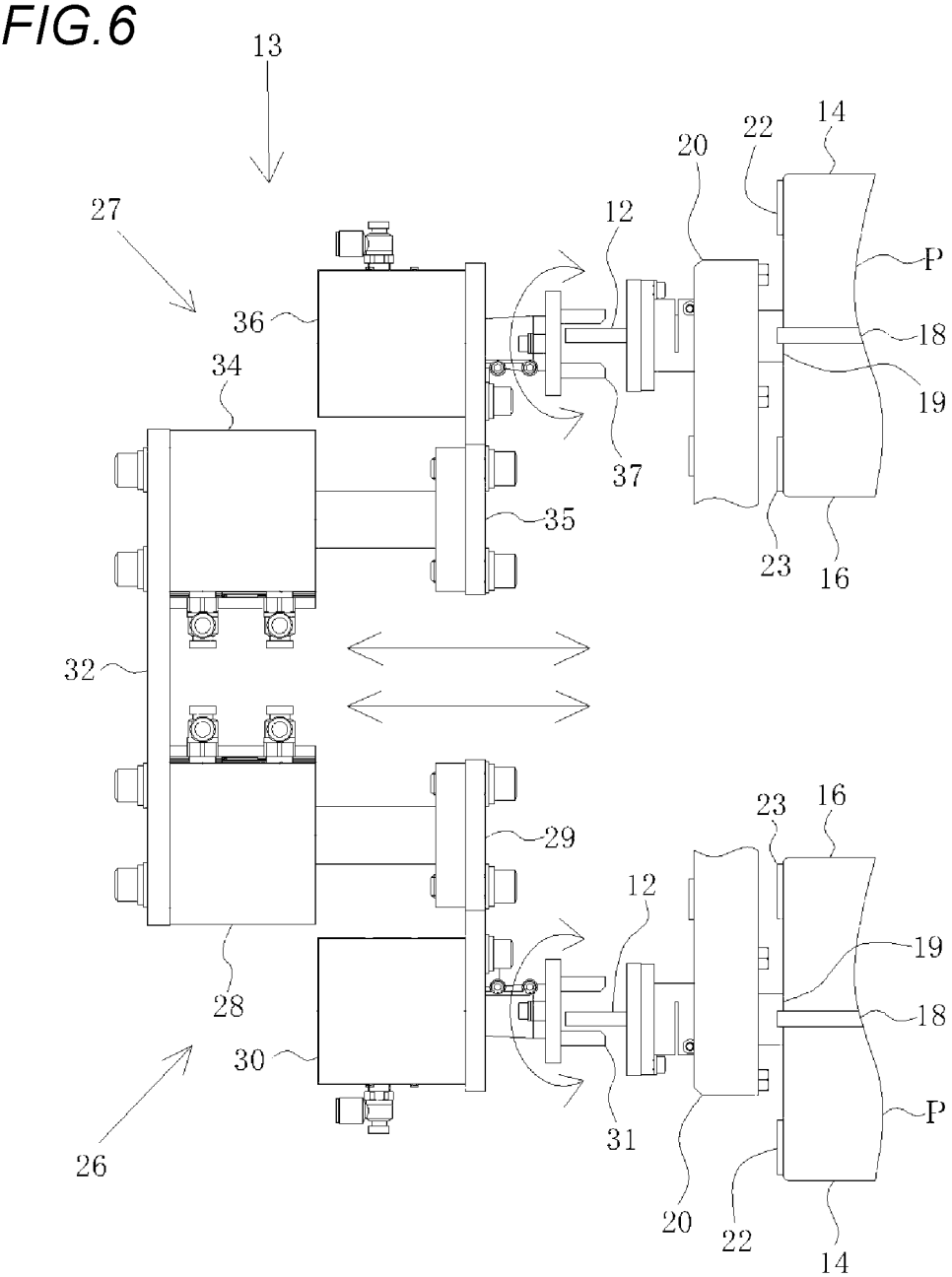
FIG. 6 is an explanatory view of a rotating unit and a hooked portion.
Figure 7:
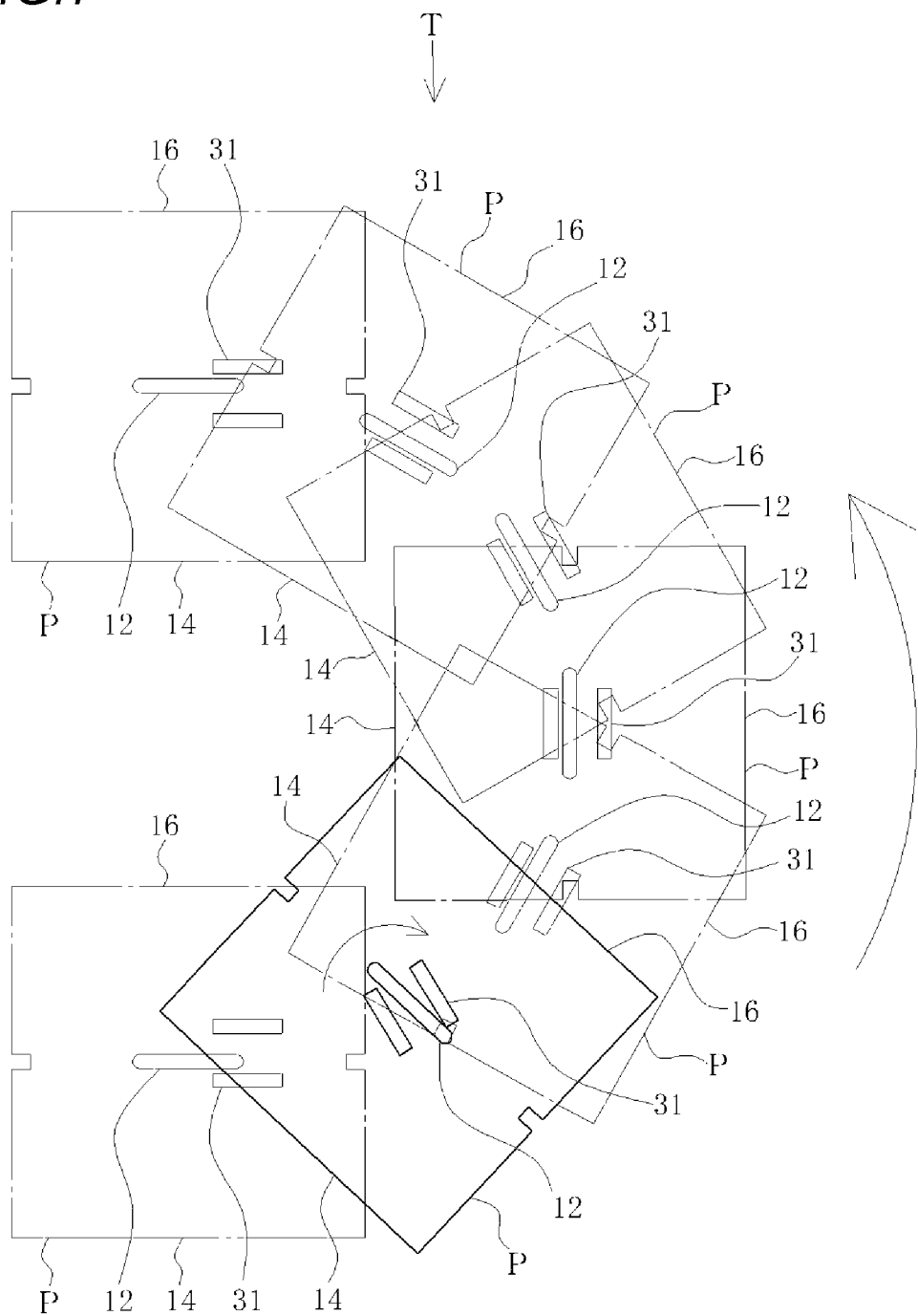
FIG. 7 is an explanatory view of the reversing conveyance of the pallet.

The rotating unit 13 includes a first rotating unit 26 and a second rotating unit 27 (see FIGS. 3 and 6).

The rotating unit 13 connects the first rotating unit 26 and the second rotating unit 27 to each other via a connecting member 32 such that the first rotating unit 26 and the second rotating unit 27 face each other in a straight line.

The description of accompanying program control, air piping, electrical wiring, an amplifier, and the like will be omitted.

The rotating unit 13 is attached to one of outer sides of a rotation shaft 33 of the tail T of the conveyor 11 via the center of the connecting member 32 such that the rotating unit 13 can rotate freely in synchronization in the conveyance direction of the conveyor 11.

Accordingly, in response to the conveyor 11 being driven, the rotating unit 13 rotates in synchronization with the rotation shaft 33, and the first rotating unit 26 and the second rotating unit 27 rotate in synchronization with the conveyance speed of the conveyor 11.

The rotation shaft 33 is rotatably supported by conveyor bearings 38 and 38.

Since a known rotary joint 39 is provided at one end of the rotation shaft 33, twisting of air piping and the like (not shown) due to the rotation of the rotating unit 13 is eliminated.

The rotating unit 13 may be attached to one of outer sides of the rotation shaft (not shown) of the head H of the conveyor 11 via the center of the connecting member 32 such that the rotating unit 13 can rotate freely in synchronization in the conveyance direction of the conveyor 11.

The first rotating unit 26 includes a first air cylinder 28, which is an advancing and retreating portion, that can freely advance and retreat on a conveyor 11 side, a first advancing and retreating member 29 that is connected to a tip end of a rod of the first air cylinder 28, a first rotating cylinder 30 that is connected to the first advancing and retreating member 29, and a first hook portion 31 that is provided rotatably in the conveyance direction of the conveyor 11 by connecting to the first rotating cylinder 30.

The advancing and retreating portion of the first rotating unit 26 is not limited to the air cylinder.

The first hook portion 31 is formed of two plate members that protrude in parallel toward the conveyor 11.

The first hook portion 31 is provided in the first rotating unit 26 such that one plate member, which is the hooked portion 12, can be hooked and rotated by inserting the one plate member between two plate members.

As described above, the first hook portion 31 also serves as a guide that guides the hooked portion 12.

The first rotating unit 26 is attached to one of the outer sides of the rotation shaft 33 via the connecting member 32 such that the first hook portion 31 can synchronously face the hooked portion 12 moving as the pallet P is conveyed.

Parameters such as moving amount and moving speed of the first rotating unit 26 are adjusted in advance.

Accordingly, while the first rotating unit 26 rotates in the conveyance direction of the conveyor 11, the first hook portion 31 is configured to be freely move forward and backward with respect to the hooked portion 12 and to be freely rotate in the conveyance direction of the conveyor 11.

Therefore, by hooking the first hook portion 31 to the hooked portion 12 and rotating the first hook portion 31 by 180 degrees while synchronizing with the conveyance speed of the conveyor 11, the pallet P is reversed, so that the die of the pallet P can be replaced from the die 15 on the front surface 14 to the die 17 on the back surface 16, or from the die 17 on the back surface 16 to the die 15 on the front surface 14.

When the rotating unit 13 rotates in the conveying direction of the conveyor 11, if the first hook portion 31 does not become an obstacle such as hitting a part of the conveyor 11, the first rotating unit 26 may include only the first rotating cylinder 30 and the first hook portion 31.

The second rotating unit 27 includes a second air cylinder 34, which is an advancing and retreating portion, that can freely advance and retreat on the conveyor 11 side, a second advancing and retreating member 35 that is connected to a tip end of a rod of the second air cylinder 34, a second rotating cylinder 36 that is connected to the second advancing and retreating member 35, and a second hook portion 37 that is provided rotatably in the conveyance direction of the conveyor 11 by connecting to the second rotating cylinder 36.

The advancing and retracting portion of the second rotating unit 27 is not limited to the air cylinder.

The second hook portion 37 is formed of two plate members that protrude in parallel toward the conveyor 11.

The second hook portion 37 is provided in the second rotating unit 27 such that one plate member, which is the hooked portion 12, can be hooked and rotated by inserting the one plate member between two plate members.

As described above, the second hook portion 37 also serves as a guide that guides the hooked portion 12.

The second rotating unit 27 is adjusted in advance and attached to one of the outer sides of the rotation shaft 33 via the connecting member 32 such that the second hook portion 37 can synchronously face the hooked portion 12 moving as the pallet P is conveyed.

Parameters such as moving amount and moving speed of the second rotating unit 27 are adjusted in advance.

Accordingly, while the second rotating unit 27 rotates in the conveyance direction of the conveyor 11, the second hook portion 37 is configured to be freely move forward and backward with respect to the hooked portion 12 and to be freely rotate in the conveyance direction of the conveyor 11.

Therefore, by hooking the second hook portion 37 to the hooked portion 12 and rotating the second hook portion 37 by 180 degrees while synchronizing with the conveyance speed of the conveyor 11, the pallet P is reversed, so that the die of the pallet P can be replaced from the die 15 on the front surface 14 to the die 17 on the back surface 16, or from the die 17 on the back surface 16 to the die 15 on the front surface 14.

When the rotating unit 13 rotates in the conveying direction of the conveyor 11, if the second hook portion 37 does not become an obstacle such as hitting a part of the conveyor 11, the second rotating unit 27 may include only the second rotating cylinder 36 and the second hook portion 37.

The rotating unit 13 may include only the first rotating unit 26.

The rotating unit 13 may include not only the first rotating unit 26 and the second rotating unit 27 but also a third rotating unit or more having the same configuration.

The hooked portion 12 is not limited to that formed of one plate member protruding outward, and the first hook portion 31 and the second hook portion 37 are not limited to those formed of two plate members protruding in parallel toward the conveyor 11.

Any shape may be used as long as the hooked portion 12 can be hooked by the first hook portion 31 or the second hook portion 37 and the hooked portion 12 can be reversed.

For example, the hooked portion 12 has a known convex shape (or a known concave shape), and the first hook portion 31 or the second hook portion 37 has a known concave shape (or a known convex shape).

The hooked portion 12 may be formed of two plate members protruding in parallel toward the outside of the conveyor 11, and the first hook portion 31 and the second hook portion 37 may be formed of one plate member protruding toward the conveyor 11.

The first rotating unit 26 and the second rotating unit 27 can be operated either independently or in synchronization under program control.

The operation of the pallet reversing apparatus 10 for a conveyor according to the present invention will be described (see FIGS. 1 to 7).

A case will be described in which the pallet P whose outer direction (a surface on which the operator performs an operation) is the die 15 on the front surface 14 and whose inner direction is the die 17 on the back surface 16 is reversed and replaced with the pallet P whose outer direction is the die 17 on the back surface 16 and whose inner direction is the die 15 on the front surface 14.

When the pallet P in which the hooked portion 12 is guided by the lower guide 40 and whose outer direction is the die 15 on the front surface 14 and whose inner direction is the die 17 on the back surface 16 is conveyed by the conveyor 11 from a center point of the rotation shaft 33 in the tail T to a lower side in a vertical direction, the lower identification sensor 44 reads the identification code 22 for identifying that the outer direction is the die 15 on the front surface 14, and identifies the die 15 of the pallet P.

At this time, the second rotating unit 27 is located at a position facing the first rotating unit 26 on a straight line, and is arranged at a position corresponding to another pallet P after replacement that is conveyed from the center point of the rotation shaft 33 in the tail T to an upper side in the vertical direction. The outer direction of the pallet P is the die 17 on the back surface 16 and the inner direction of the pallet P is the die 15 on the front surface 14.

The second advancing and retreating member 35 of the second air cylinder 34 contracts outward. The second hook portion 37 connected to the second rotating cylinder 36 is separated from the hooked portion 12. The hooked portion 12 guided by the second hook portion 37 is guided between the upper guides including the bent member 41 and the horizontal member 42.

When the pallet P after replacement whose outer direction is the die 17 on the back surface 16 and whose inner direction is the die 15 on the front surface 14 is conveyed by the conveyor 11 from the center point of the rotation shaft 33 in the tail T to the upper side in the vertical direction, the upper identification sensor 24 reads the identification code 23 for identifying that the outer direction is the die 17 on the back surface 16, identifies the die 17 of the pallet P, and confirms that there is no error in the replacement with the die 17.

Therefore, the operator does not erroneously place the product W on a wrong die to perform an operation.

In order to guide, by the first hook portion 31, the hooked portion 12 after being guided by the lower guide 40, the first advancing and retreating member 29 of the first air cylinder 28 of the first rotating unit 26 of the rotating unit 13 rotating in synchronization with the rotation shaft 33 is extended toward the conveyor 11.

When the first advancing and retreating member 29 is extended toward the conveyor 11, the first hook portion 31 connected to the first rotating cylinder 30 extends toward the hooked portion 12, and the one plate member is inserted and guided between the two plate members. The one plate member is the hooked portion 12. The two plate members are the first hook portion 31.

Then, when the pallet reversing apparatus 10 receives a replacement signal for replacing the outer direction to the die 17 on the back surface 16, in order to reverse the pallet P whose outer direction is the die 15 on the front surface 14 and whose inner direction is the die 17 on the back surface 16 and replace the pallet P with the pallet P whose outer direction is the die 17 on the back surface 16 and whose inner direction is the die 15 on the front surface 14, immediately, the first hook portion 31 is rotated by 180 degrees, and the one plate member is hooked between the two plate members and is rotated by 180 degrees. The one plate member is the hooked portion 12. The two plate members are the first hook portion 31.

When the pallet reversing apparatus 10 does not receive the replacement signal for replacing the outer direction to the die 17 on the back surface 16, the first hook portion 31 is not rotated by 180 degrees.

Here, the replacement signal may be input by the operator, and timing at which the replacement signal is input may be predetermined by the program control. A method for inputting the replacement signal is not limited to these manners.

When the one plate member, which is the hooked portion 12, rotates by 180 degrees, the flat plate member 18 also rotates by 180 degrees in synchronization, and the pallet P is accordingly reversed.

Accordingly, the pallet P whose outer direction is the die 15 on the front surface 14 and whose inner direction is the die 17 on the back surface 16 is replaced with the pallet P whose outer direction is the die 17 on the back surface 16 and whose inner direction is the die 15 on the front surface 14.

Then, the pallet P is conveyed from the center point of the rotation shaft 33 in the tail T to the upper side in the vertical direction, the first advancing and retreating member 29 of the first air cylinder 28 contracts outward, the first hook portion 31 separates from the hooked portion 12, and the hooked portion 12 guided by the first hook portion 31 is guided between the upper guides including the bent member 41 and the horizontal member 42.

Then, the upper identification sensor 24 reads the identification code 23 for identifying that the outer direction is the die 17 on the back surface 16, identifies the die 17 of the pallet P, and confirms that there is no error in the replacement with the die 17.

At this time, the second rotating unit 27 is located at the position facing the first rotating unit 26 on a straight line, and is arranged at, in the similar manner to the first rotating unit 26, a position corresponding to a new pallet P before replacement that is conveyed from the center point of the rotation shaft 33 in the tail T to the lower side in the vertical direction, the outer direction of the pallet P is the die 15 on the front surface 14 and the inner direction of the pallet P is the die 17 on the back surface 16.

By repeating the above, without stopping the pallet P being conveyed, the pallet P whose outer direction is the die 15 on the front surface 14 and whose inner direction is the die 17 on the back surface 16 is sequentially reversed and replaced with the pallet P whose outer direction is the die 17 on the back surface 16 and whose inner direction is the die 15 on the front surface 14.

As described above, due to the structure of the conveyor 11, the pallets P are reversed at the tail T (or the head H) where there is a sufficient interval between the pallets P being conveyed, so that the pallets P do not collide with each other.

As described above, the pallets P are reversed at the tail T (or the head H), so that an operation of the operator performed in a region other than the tail T and the head H is not interrupted.

According to a first aspect of the present disclosure, a pallet reversing apparatus for a conveyor configured to convey a pallet including a die whose a front surface and a back surface of the die are different includes: a rotating unit configured to rotate the pallet with respect to a conveyance direction via a shaft provided at a center of the pallet; and a hooked portion provided at one end of the shaft. The rotating unit is provided on one side of a rotation shaft of a head or a tail of the conveyor, and rotates in synchronization with the rotation shaft. The rotating unit includes a hook portion configured to rotate with respect the conveyance direction. The rotating unit rotates the hook portion by 180 degrees in a state of hooking the hook portion to the hooked portion, so that the pallet is reversed with respect to the conveyance direction.

According to a second aspect of the present disclosure, in the first aspect, when the pallet is conveyed from a center point of the rotation shaft to a lower side in a vertical direction, the rotating unit may rotate the hook portion until the pallet is conveyed to an upper side in the vertical direction.

According to a third aspect of the present disclosure, in the first or second aspect, when the pallet is conveyed from a center point of the rotation shaft to an upper side in a vertical direction, the hooked portion may be guided between a bent member and a horizontal member of the conveyor.

According to a fourth aspect of the present disclosure, in the first or second aspect, the hooked portion may include one plate member protruding outward. The hook portion may include two plate members protruding in parallel toward the conveyor. The rotating unit may actuate the hook portion such that the one plate member is inserted between the two plate members, and may hook the hook portion to the hooked portion.

According to a fifth aspect of the present disclosure, a pallet reversing apparatus for a conveyor configured to convey a pallet including a die whose a front surface and a back surface of the die are different includes: a rotating unit configured to rotate the pallet with respect to a conveyance direction via a shaft provided at a center of the pallet; and a hooked portion provided at one end of the shaft. The rotating unit is provided on one side of a rotation shaft of a head or a tail of the conveyor, and rotates in synchronization with the rotation shaft. The rotating unit includes a hook portion configured to advance and retreat with respect to the hooked portion, and configured to rotate with respect the conveyance direction. The rotating unit rotates the hook portion by 180 degrees in a state of hooking the hook portion to the hooked portion, so that the pallet is reversed with respect to the conveyance direction.

According to a sixth aspect of the present disclosure, in the fifth aspect, when the pallet is conveyed from a center point of the rotation shaft to a lower side in a vertical direction, the rotating unit may rotate the hook portion until the pallet is conveyed to an upper side in the vertical direction.

According to a seventh aspect of the present disclosure, in the fifth or sixth aspect, when the pallet is conveyed from a center point of the rotation shaft to an upper side in a vertical direction, the hooked portion may be guided between a bent member and a horizontal member of the conveyor.

According to an eighth aspect of the present disclosure, in the fifth or sixth aspect, the hooked portion may include one plate member protruding outward. The hook portion may include two plate members protruding in parallel toward the conveyor. The rotating unit may actuate the hook portion such that the one plate member is inserted between the two plate members, and may hook the hook portion to the hooked portion.

What is claimed is:

1. A pallet reversing apparatus for a conveyor configured to convey a pallet including a die, a front surface and a back surface of the die being different, the pallet reversing apparatus for the conveyor comprising:
 a rotating unit configured to rotate the pallet with respect to a conveyance direction via a shaft provided at a center of the pallet, the center being between the front surface and the back surface of the die, such that the front surface and the back surface of the die are switched; and
 a hooked portion provided at one end of the shaft, wherein
 the rotating unit is provided on one side of a rotation shaft of a head or a tail of the conveyor, and rotates in synchronization with the rotation shaft, the rotating unit includes a hook portion configured to rotate, and
 the rotating unit rotates the hook portion by 180 degrees in a state of hooking the hook portion to the hooked portion, so that the pallet is reversed such that the front surface and the back surface of the die are switched.

2. The pallet reversing apparatus for the conveyor according to claim 1, wherein
 when the pallet is conveyed from a center point of the rotation shaft to a lower side in a vertical direction, the rotating unit rotates the hook portion until the pallet is conveyed to an upper side in the vertical direction.

3. The pallet reversing apparatus for the conveyor according to claim 1, wherein
 when the pallet is conveyed from a center point of the rotation shaft to an upper side in a vertical direction, the hooked portion is guided between a bent member and a horizontal member of the conveyor.

4. The pallet reversing apparatus for the conveyor according to claim 1, wherein
 the hooked portion includes one plate member protruding outward,
 the hook portion includes two plate members protruding in parallel toward the conveyor, and
 the rotating unit actuates the hook portion such that the one plate member is inserted between the two plate members, and hooks the hook portion to the hooked portion.

5. A pallet reversing apparatus for a conveyor configured to convey a pallet including a die, a front surface and a back surface of the die being different, the pallet reversing apparatus for the conveyor comprising:
 a rotating unit configured to rotate the pallet with respect to a conveyance direction via a shaft provided at a center of the pallet, the center being between the front surface and the back surface of the die, such that the front surface and the back surface of the die are switched; and
 a hooked portion provided at one end of the shaft, wherein
 the rotating unit is provided on one side of a rotation shaft of a head or a tail of the conveyor, and rotates in synchronization with the rotation shaft,
 the rotating unit includes a hook portion configured to advance and retreat with respect to the hooked portion, and configured to rotate, and
 the rotating unit rotates the hook portion by 180 degrees in a state of hooking the hook portion to the hooked portion, so that the pallet is reversed such that the front surface and the back surface of the die are switched.

6. The pallet reversing apparatus for the conveyor according to claim 5, wherein
 when the pallet is conveyed from a center point of the rotation shaft to a lower side in a vertical direction, the rotating unit rotates the hook portion until the pallet is conveyed to an upper side in the vertical direction.

7. The pallet reversing apparatus for the conveyor according to claim 5, wherein
 when the pallet is conveyed from a center point of the rotation shaft to an upper side in a vertical direction, the hooked portion is guided between a bent member and a horizontal member of the conveyor.

8. The pallet reversing apparatus for the conveyor according to claim 5, wherein
 the hooked portion includes one plate member protruding outward,
 the hook portion includes two plate members protruding in parallel toward the conveyor, and
 the rotating unit actuates the hook portion such that the one plate member is inserted between the two plate members, and hooks the hook portion to the hooked portion.

* * * * *